(12) United States Patent
Cook

(10) Patent No.: US 6,198,471 B1
(45) Date of Patent: Mar. 6, 2001

(54) FREE-FLOATING MULTI-AXIS CONTROLLER

(76) Inventor: Brandt A. Cook, 90 16th St. SW., Unit C, Barberton, OH (US) 44203

( * ) Notice: Subject to any disclaimer, the term of this patent is extended or adjusted under 35 U.S.C. 154(b) by 0 days.

(21) Appl. No.: 09/131,122

(22) Filed: Aug. 7, 1998

Related U.S. Application Data

(63) Continuation-in-part of application No. 08/966,302, filed on Nov. 7, 1997, now abandoned.

(51) Int. Cl.[7] .................................................. G09G 5/08
(52) U.S. Cl. ............................ 345/161; 345/156; 463/38
(58) Field of Search ..................................... 345/156, 161, 345/160, 159, 163–167, 169; 463/36–39; 74/471 XY; D14/117.5, 114, 117.1; 200/6 A

(56) References Cited

U.S. PATENT DOCUMENTS

| | | | |
|---|---|---|---|
| D. 291,787 * | 9/1987 | Sheldon .............................. D10/78 |
| D. 292,299 * | 10/1987 | Thomas ............................... D21/48 |
| D. 362,872 * | 10/1995 | Chan ................................... D21/48 |
| D. 366,655 * | 1/1996 | Sanchez et al. .................... D14/114 |
| D. 371,773 * | 7/1996 | Sanchez et al. .................... D14/114 |
| D. 372,709 * | 8/1996 | Sanchez et al. .................... D14/114 |
| D. 374,218 * | 10/1996 | Sanchez et al. .................... D14/114 |
| D. 377,056 * | 12/1996 | Salinas ................................ D21/48 |
| 4,091,234 * | 5/1978 | Bristow et al. ........................ 178/18 |
| 4,107,642 * | 8/1978 | Crummett et al. .................. 338/128 |
| 4,156,130 * | 5/1979 | Ivashin et al. ......................... 235/92 |
| 4,217,569 * | 8/1980 | Nejedly ................................. 338/2 |
| 4,281,561 * | 8/1981 | Groskopfs ............................ 74/471 |
| 4,439,649 * | 3/1984 | Cecchi ................................ 200/6 A |
| 4,468,688 * | 8/1984 | Gabriel et al. ........................ 358/22 |
| 4,520,355 * | 5/1985 | Mitch .................................. 340/709 |
| 4,641,123 * | 2/1987 | Whitehead .......................... 338/128 |
| 4,686,361 * | 8/1987 | Bard .................................... 250/221 |
| 4,691,659 * | 9/1987 | Ito et al. .............................. 114/144 |
| 4,700,802 * | 10/1987 | Fought ................................ 180/324 |
| 4,763,100 * | 8/1988 | Wood .................................. 338/128 |
| 4,794,388 * | 12/1988 | Matthews ............................ 340/731 |
| 4,795,952 * | 1/1989 | Brandstetter ........................ 318/560 |
| 4,864,272 * | 9/1989 | Cecchi et al. ....................... 338/128 |
| 4,866,602 * | 9/1989 | Hall .................................... 364/200 |
| 4,910,503 * | 3/1990 | Brodsky .............................. 340/706 |
| 5,012,230 * | 4/1991 | Yasuda ................................ 340/706 |
| 5,181,181 * | 1/1993 | Glynn .................................. 364/566 |
| 5,252,970 * | 10/1993 | Baranowsky ......................... 341/20 |
| 5,296,846 * | 3/1994 | Ledley ................................ 345/161 |
| 5,298,919 * | 3/1994 | Chang ................................. 345/163 |
| 5,313,230 * | 5/1994 | Venolia et al. ...................... 345/163 |
| 5,329,276 * | 7/1994 | Hirabayashi et al. .............. 345/161 |
| 5,388,990 * | 2/1995 | Beckman .............................. 434/38 |
| 5,389,865 * | 2/1995 | Jacobus et al. ..................... 318/568 |
| 5,402,150 * | 3/1995 | Stiles .................................. 345/168 |
| 5,414,445 * | 5/1995 | Kaneko et al. ..................... 345/163 |
| 5,461,701 * | 10/1995 | Voth ................................... 395/101 |
| 5,473,344 * | 12/1995 | Bacon et al. ....................... 345/163 |
| 5,491,497 * | 2/1996 | Suzuki ................................ 345/157 |
| 5,496,977 * | 3/1996 | Date et al. .......................... 200/6 A |
| 5,498,843 * | 3/1996 | Date et al. .......................... 200/6 A |
| 5,499,109 * | 3/1996 | Mathur et al. ..................... 358/400 |
| 5,551,701 * | 9/1996 | Bouton et al. ....................... 463/36 |
| 5,565,886 * | 10/1996 | Gibson ............................... 345/136 |
| 5,581,669 * | 12/1996 | Voth ................................... 395/113 |
| 5,589,828 * | 12/1996 | Armstrong ........................... 341/20 |
| 5,591,082 * | 1/1997 | Jensen et al. ........................ 463/38 |
| 5,591,924 * | 1/1997 | Hilton ............................. 73/862.043 |
| 5,818,420 * | 10/1998 | Mitsumine et al. ................ 345/156 |

\* cited by examiner

*Primary Examiner*—Regina Liang
(74) *Attorney, Agent, or Firm*—Fitch, Even, Tabin & Flannery

(57) ABSTRACT

A multi-axis controller for use as free hand-held joystick is described. The controller includes a handle having an inner surface. Disposed within the handle is a dual shaft having a first arm rotatable about a first axis and a second arm rotatable out a second axis. First and second transducers detect rotation of the first and second arms about the first and second axes, respectively. The first transducer and the first end of the first arm are fixedly attached to the inner surface of the handle. A frame is fixedly attached to the second transducer. When a weight is attached to the frame, it causes the first and second arms to center in the absence of user input.

3 Claims, 17 Drawing Sheets

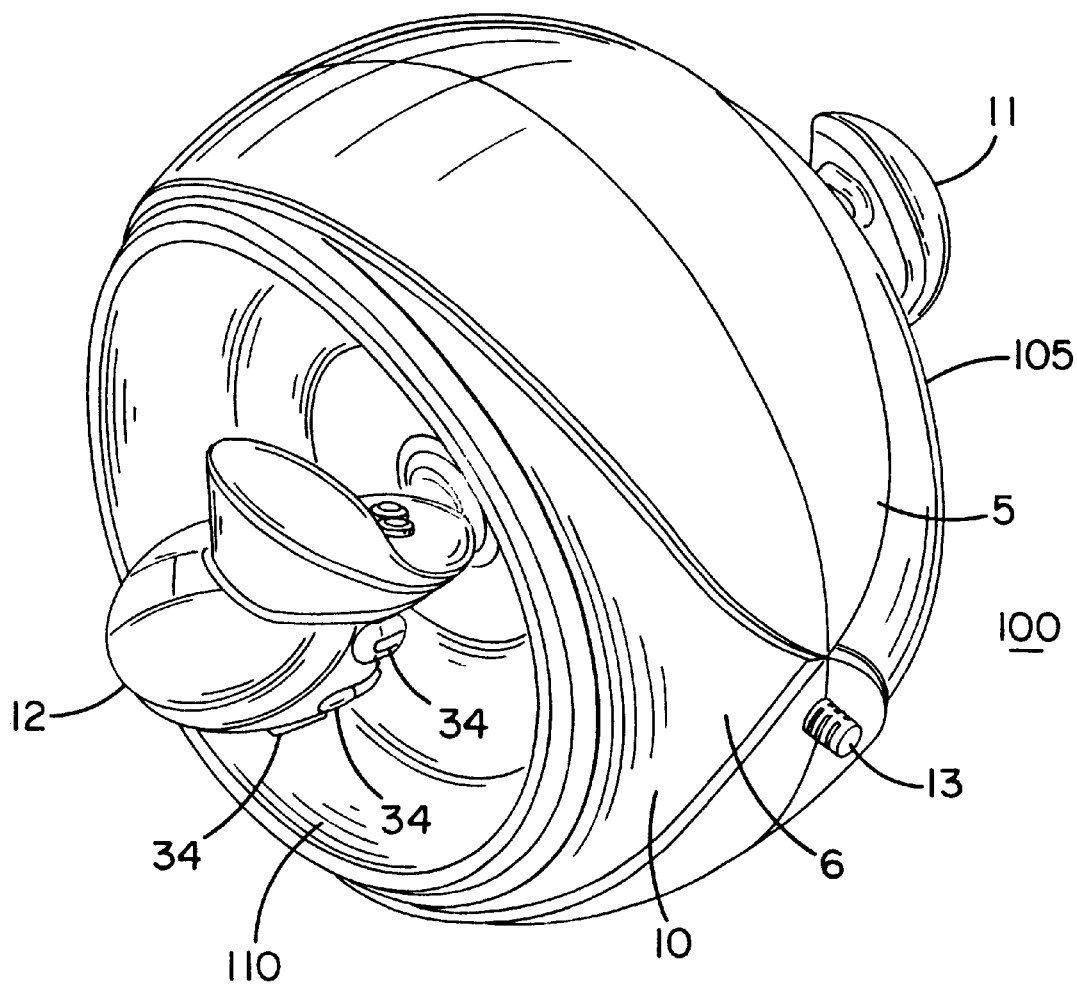
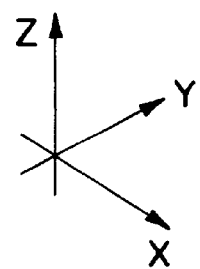
FIG. 1

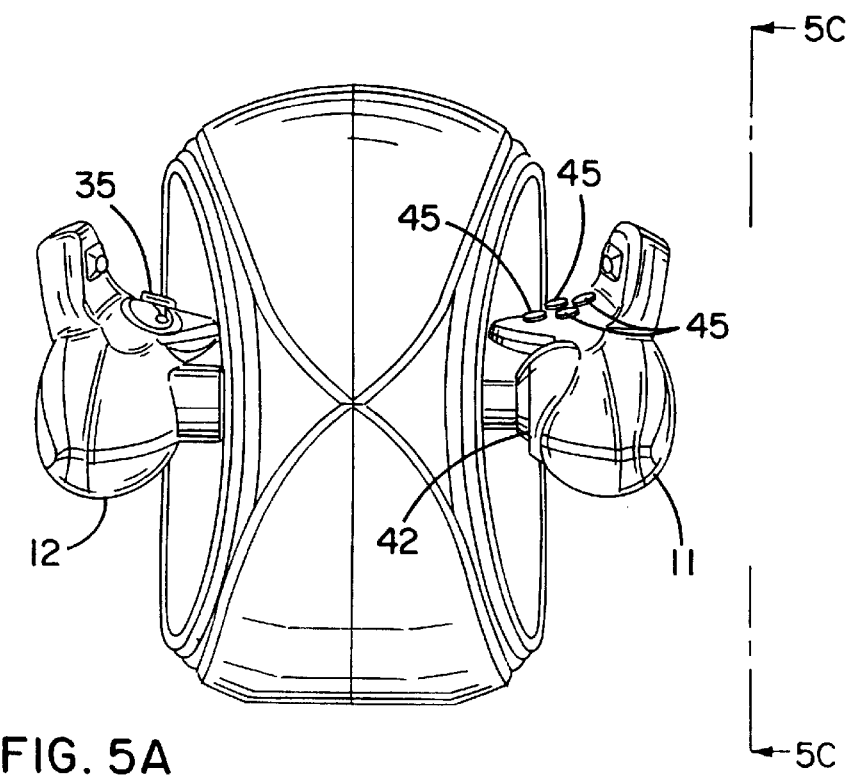
FIG. 5A
FIG. 5B
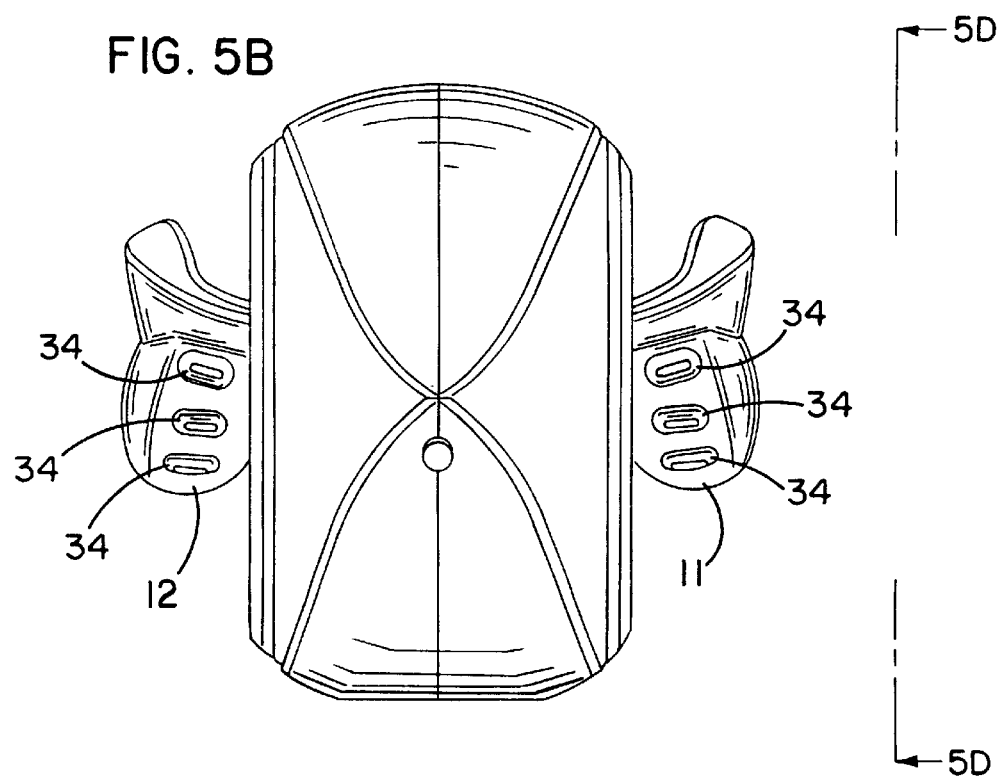

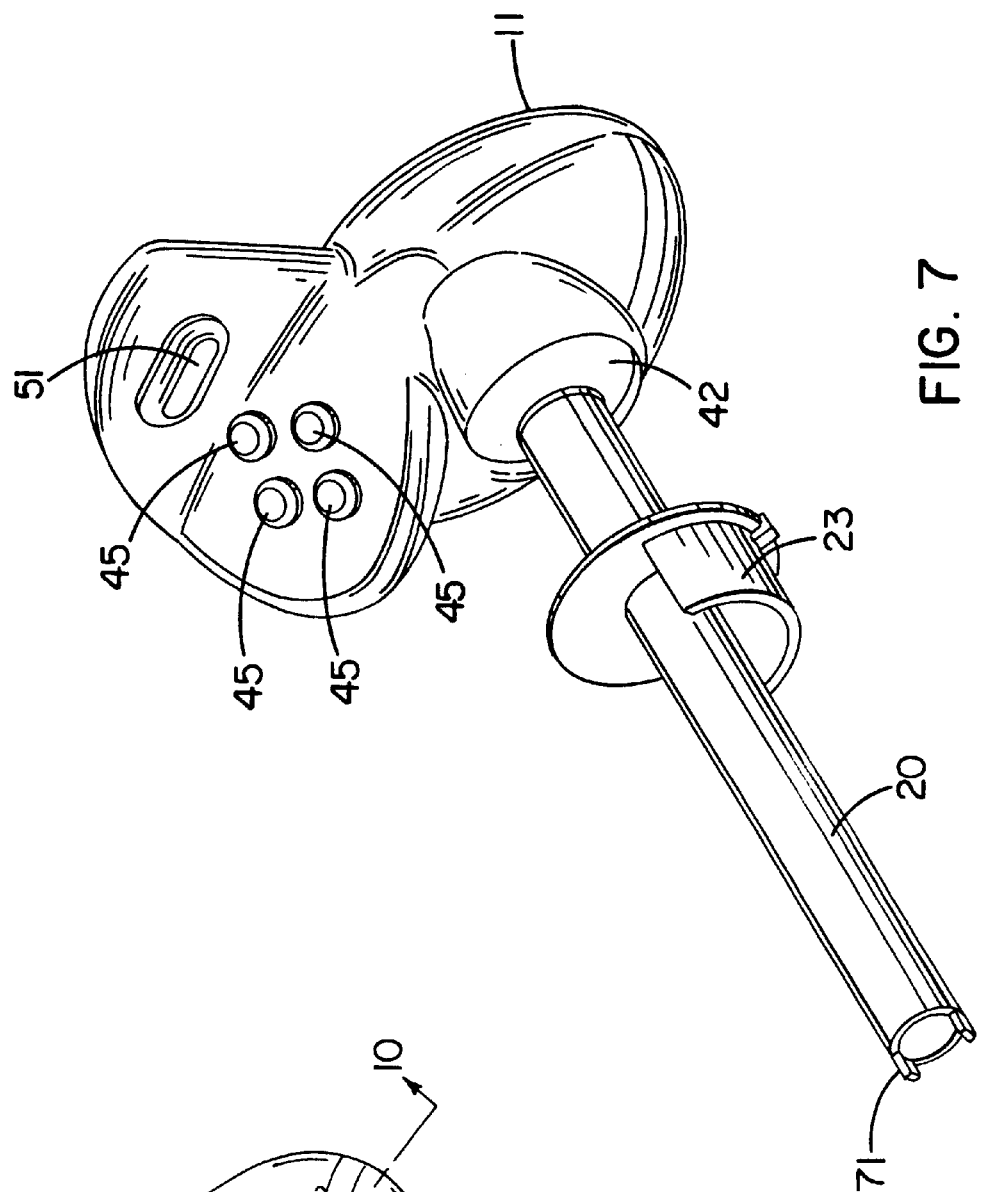
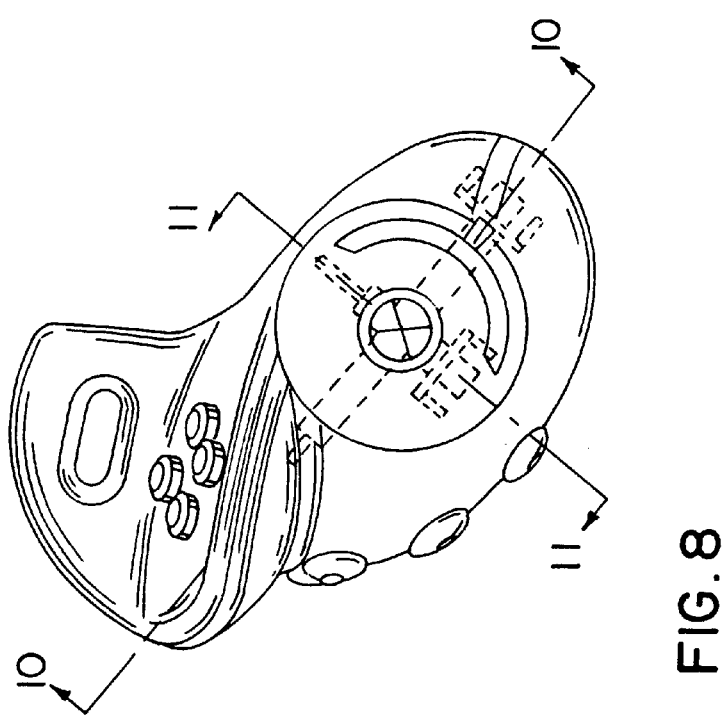

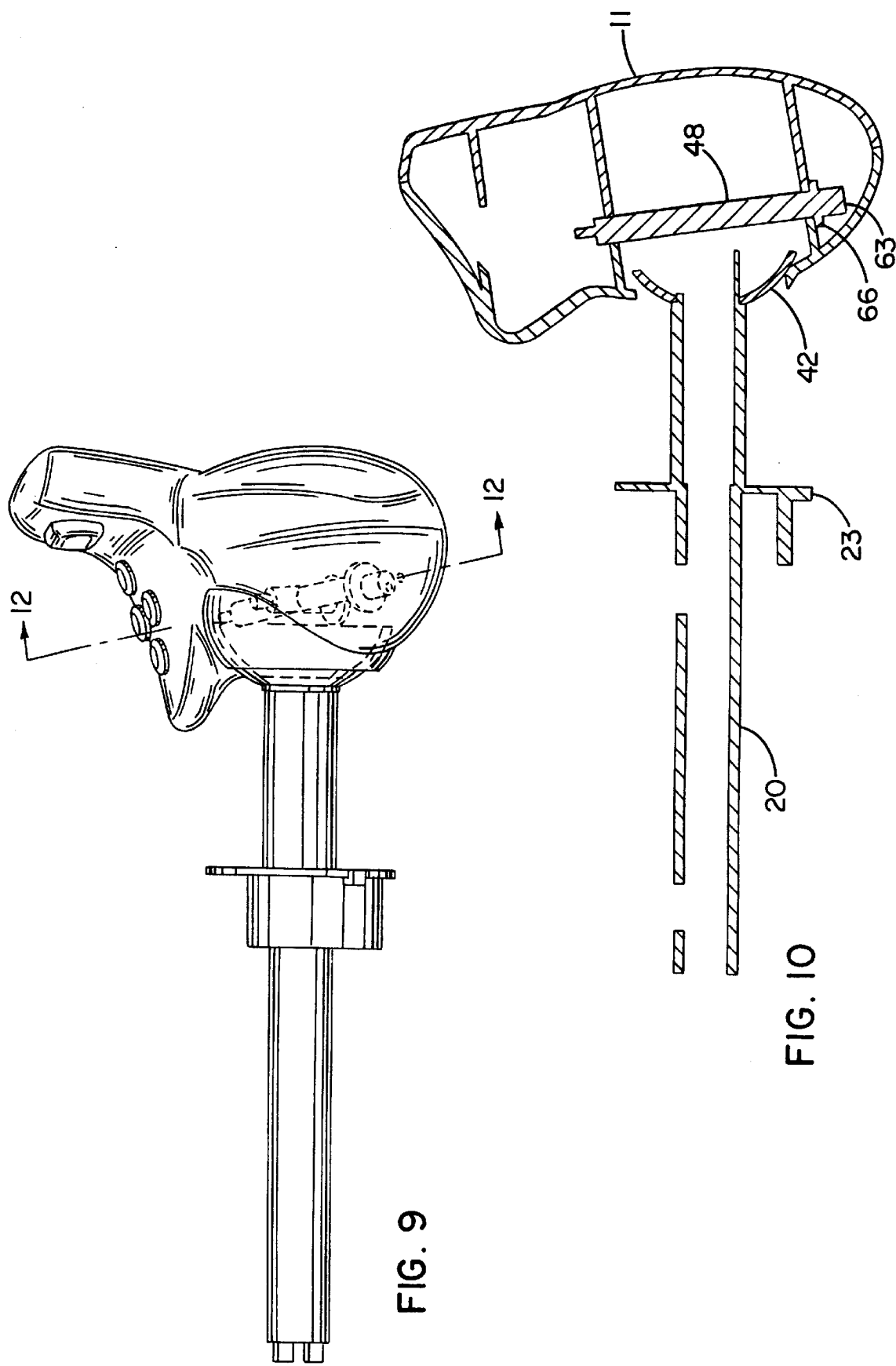

FREE-FLOATING MULTI-AXIS CONTROLLER

CROSS REFERENCE TO RELATED APPLICATION

This application is a continuation-in-part of application Ser. No. 08/966,302, filed Nov. 7, 1997.

BACKGROUND OF THE INVENTION

This invention relates to an input/output device for providing multi-axis input to and receiving multi-axis output from an information processing device to control the direction of motion of a referenced object in virtual or real three dimensional (3D) space.

Controllers similar to joysticks are used in various industrial applications to remotely control machinery, for robotics applications and to work pieces during a manufacturing process. In flight simulators, computer games and virtual reality games, a joystick typically provides the 3D interface between the user and the information processing device (or computer) running the flight simulation or game. A controller or joystick operates by generating electrical signals proportional to the displacement of a control level in the direction of each axis. U.S. Pat. No. 4,281,561 to Groskopfs, "Three Axes Controller," U.S. Pat. No. 5,589,828 to Armstrong, "6 Degrees of Freedom Controller Capable of Tactile Leedback," and U.S. Pat. No. 4,795,952 to Brandstetter, "Joystick For Three Axis Control of A Powered Element" describe typical joystick type controllers.

Joysticks and industrial controllers provide generally only a rough representation of an object in three dimensional space. Additionally, because of the length of the control lever, such controllers lack sensitivity to smaller increments of movement and do not provide a comfortable feel or feeling for the environment (real or virtual). Such prior art controllers, while useful, generally provide poor control of the relative real or virtual 3D environment. This disadvantage renders inaccurate approximations for the user's virtual or real 3D space and is uncomfortable or exhausting to the user.

U.S. Pat. No. 5,491,497 to Suzuki, "Multi-Way Input Device," describes a device for three-dimensional input to an information processing device in which the user inputs directional inputs through movement of a spherically shaped operating member which lies outside a spherically shaped housing. Movement of the operating member relative to the housing activates switches on a substrate within the housing which detect rotation in the X, Y, and Z axes. A defined movement in the sensed direction becomes, for example, a cursor movement on a television screen in two axis directions, namely in the right and left directions and the direction perpendicular to the surface. A separate actuator is also provided which enables the user to move a cursor in a uniaxial direction. Each sensed direction is achieved by a single switch arrangement and typically depression of such switches is nominal. Such limited motion, though quick in operation, is a significant drawback from human interaction relating to an object referenced in three-dimensional virtual or real space. Furthermore, Suzuki's multi-way input device is limited to use on a planar surface; motion is confined only to a downward direction because no resistance to upward motion is provided. If the device is not anchored in any fashion, uniaxial motion in the Z-axis is eliminated.

Traditionally, joysticks and controllers require only one hand to manipulate referenced objects in 3D space. Suzuki's spherically shaped controller requires two hands to operate, but it is not ergonomic; the controller is not held by the user, rather the user places one hand on the housing and the other hand on the operating member and moves one relative to the other. Also, translational motion is counter-intuitive. In Suzuki, the user must first move the operating member relative to the housing to select a direction of movement, then h e must activate a switch to start the cursor moving in that direction. Furthermore, Suzuki's device has no capability for tactile feedback response from the 3D virtual or real space; feedback is passive and limited to the depression length of the switches.

SUMMARY OF THE INVENTION

It is an object of the invention to provide a multi-axis controller for 3D virtual and real space which is comfortable, ergonomic, simple, efficient and to provide a practical means of controlling virtual and real 3D space. It is another object of the invention to provide a multi-axis controller for virtual and real 3D space which provides the user tactile feedback. It is also an object of the invention to provide a multi-axis controller for virtual and real 3D space which is capable of making 3D input intuitive to a human's directional sense. It is yet another object of the invention to provide a controller that manipulates the virtual or real 3D environment accurately, comfortably and efficiently with a realistic feeling that does not create user fatigue or exhaustion.

To achieve the foregoing and other objects, a multi-axis controller for providing inputs to, and receiving outputs from, a three-dimensional environment embodies the present invention. The controller may comprise a first drive member rotatable about a first axis; a first handle coupled to one end of the first drive member; a first transducer, coupling the first handle to the one end of the first drive member, for detecting the rotation of the first handle about the first axis; a second drive member rotatable about a second axis and rotatable about a third axis; a second handle; a second transducer, coupling the second handle to the second drive member, for detecting the rotation of the second handle about the second axis; and a third transducer, coupling the second handle to the second drive member for detecting the rotation of the second handle about the third axis.

In one embodiment, the first drive member includes a shrouding shaft formed in the shape of a hollow tube, rotatable about a first axis, and a main shaft, rotatable about the first axis. The first handle is coupled to a first end of the shrouding shaft, wherein the main shaft is rotatably disposed within the shrouding shaft and the first transducer couples the first handle to a first end of the main shaft. The second drive member may include a dual shaft having a first arm rotatable about a second axis and a second arm rotatable about a third axis. The second transducer is coupled to the second end of the main shaft and couples the second handle to the first arm of the dual shaft. The third transducer couples the second handle to the second arm of the dual shaft for detecting the rotation of the second handle about the third axis.

The multi-axis controller for virtual and real 3D space controls a real or virtual 3D environment by the manipulation of three interdependent mechanical shafts. An optional housing may be provided for containing the drive member. The housing can be formed in any convenient shape for supporting the controller on a surface, although no housing is needed to operate the controller.

One handle of the controller provides a reference from which the user applies inputs or articulation through the second handle. The controller is described herein specifically where the first, or left, handle is the reference handle and the second, or right, handle is the input handle. This configuration can be easily reversed so that the right handle is the reference and the left handle is the input handle. Right handed and left handed users can easily operate the controller in either position.

The user manipulates objects referenced in virtual or real 3D space by left and right handles arranged preferably on opposite sides of the drive member, or at 180 degrees from one another. Manipulation of the first and second handles causes internal responses in the transducers which are translated into electrical signals. The electrical signals are then processed by an information processing device to manipulate an object in its respective virtual or real 3D environment (either through operation of a computer program or transmitted to a piece of hardware such as a robotic device). Additionally, tactile feedback devices can be installed so that the user can be acted upon through feedback responses from the controller according to the real or virtual 3D environment. Torsion springs may be added to each avis to locate the handles to a convenient center position, when the controller is not in use.

The controller according to the invention can be held in the user's hands, lap or positioned on a table. The handles or grips enable the user to easily and comfortably operate the controller. Rotation in each of the three axes is detected by transducers which are located close to the point of articulation, in the handles. This enables faster information processors with higher sampling rates to sample smaller increments of movement and detect smaller degrees of rotation. For ensample, detecting a degree of movement corresponding to two ohms of resistance on a transducer, such as a potentiometer, is much easier to achieve when the point of articulation is less than an inch from the place of movement as taught by the invention than when compared to the several inches of a joystick lever in the prior art.

The invention is useful in all types of industry which manipulate three dimensional virtual or real space. In such use, the comfortable handle location, placement of the controller and tactile feedback gives the user accurate control over the environment which he chooses to manipulate, thus creating a higher degree of perception arid understanding of the manipulated object's position in three dimensional space. The electronics are located at the actual point of movement for increased accuracy and greater sensitivity. The user can readily change directional movements in real or virtual 3D space by electronically switching the configuration of the controller. The controller provides input in three-dimensional directions intuitive to a human's directional sense.

In an alternative embodiment, the dual shaft is coupled to a free weight within a single handle. The force of gravity on the free weight eliminates the need for a second or reference handle. Rotation of the handle about the two axes of the dual shaft provides movement in two-dimensional space. This movement along the X and Y axes (X and Y are chosen for convenience) can be easily translated to movement in a plane on a computer screen.

This embodiment of a controller is particularly suited as a free hand-held joystick, such as wouodl be used for playing video games. The handle is shaped to include a grip. Movement by the user's hand in free space provides a more realistic and comfortable play than with a conventional joystick. Tactile feedback is provided by the force of gravity through the free weight suspended within the handle. Wires from the potentiometers for sending signals representative of movement are channeled to a cable at an end of the handle. The cable may be connected to a computer. Alternatively, signals from the transducers therein may be transmitted via radio frequency or infrared signals to the processing unit.

BRIEF DESCRIPTION OF THE DRAWINGS

FIG. 1 is a perspective view of a multi-axis controller with an optional housing;

FIG. 7 is a perspective view of the right handle coupled to the drive member;

FIG. 8 is a view along the drive member looking into the right handle;

FIG. 9 is a back view of the drive member and right handle;

FIG. 10 is a cross-sectional view along line A—A of FIG. 8;

DETAILED DESCRIPTION OF THE PREFERRED EMBODIMENTS

Figure 2:
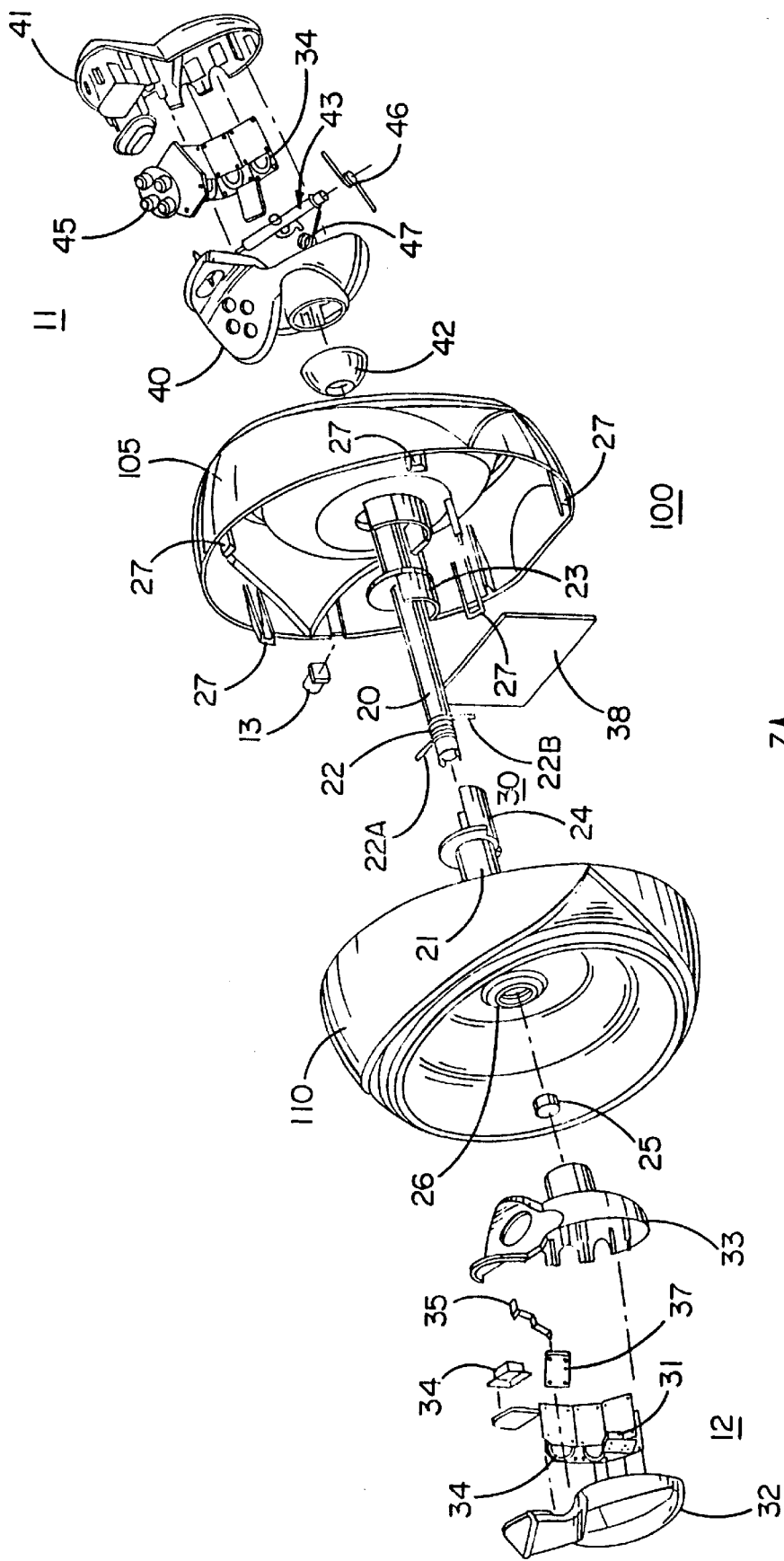
FIG. 2 is an exploded view of the multi-axis controller of FIG. 1.

Referring to FIG. 1, multi-axis controller 100 is shown with an optional housing 10 surrounding drive member 30. Electrical power is supplied through cord (or cable) 13, which is connected to the various printed circuit boards activated by the various switches (wiring not shown), including button switches 34. Housing 10 consists of right and left members 5, 6 which are joined together by clips (not shown). Housing 10 is shown here as spherical in shape with concave recesses 110 and 105 for receiving left handle 12 and right handle 11, but may be formed in other shapes. For example, housing 10 may be in the shape of a yoke, such as for a flight simulator, or a simple pedestal to support controller 100. The spherical design is convenient for placement in a user's lap, but is not limited to this location; the controller can be easily operated from a planar surface.

The multi-a is controller contemplates one handle being used to fixedly hold the controller at one end, with the other handle being operated to provide multi-axis inputs to, and receive multi-axis outputs from, a virtual or real 3D environment. The multi-axis controller is described, for convenience, with the left handle designated as the fixed handle and the right handle as the moving or activating handle. Clearly, the multi-axis controller can be configured so that the right handle is the fixed handle and the left handle the activating handle.

Referring to FIG. 2, controller 100 is shown in exploded view with the Y-axis labeled for convenience as the direction along drive member 30. Drive member 30 includes main shaft 20 disposed within shrouding shaft 21. Main shaft 20 is coupled to at one end to transducer 31, which detects rotation of main shaft 20 about the Y-axis. Transducer 31 is shown in this embodiment as a potentiometer, but clearly other forms of transducers (for example, optical encoders) may be used to detect the rotation of main shaft 20. Cap 25 receives transducer 31 and keys onto the end of main shaft 20 to rotatably couple main shaft 20 to left handle 12. Torsion spring 22 is wound around main shaft 20 and includes two extensions 22A and 22B. Torsion spring extensions 22A and 22B fit against projection 24 of shrouding shaft 21 and projection 23 of main shaft 20, respectively, to center the controller when it is not responding to inputs from the user or an information processing device.

Figure 4:
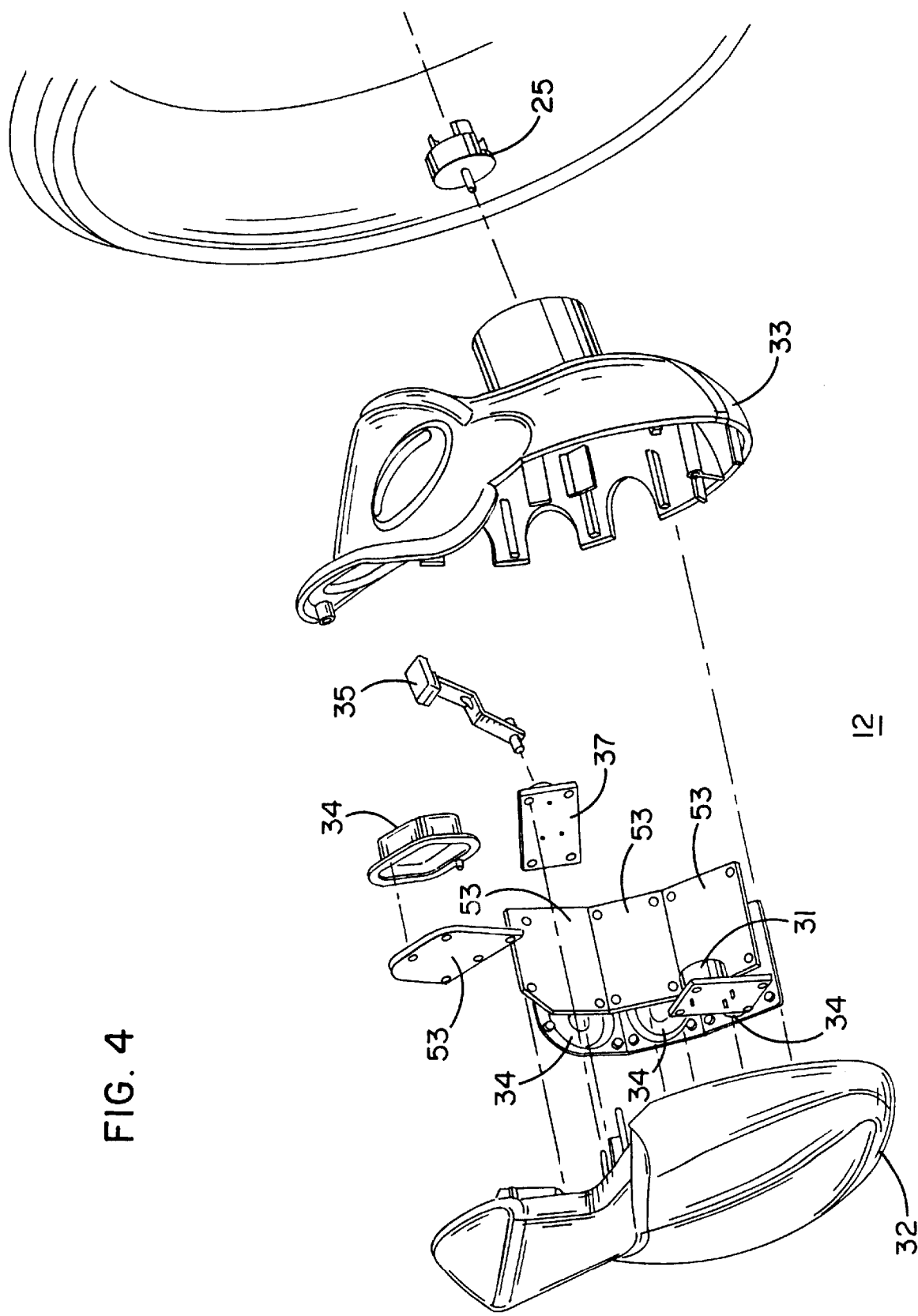
FIG. 4 is an exploded view of a left handle.

Referring to FIGS. 2 and 4, left handle 12 includes outer cover 32 and inner cover 33. A plurality of switch buttons 34 can be programmed through the information processing device (or computer) to activate various program functions. Switch button 34 activates printed circuit board 53, which sends signals through wiring (not shown) to main board 38 to cord 13 to the information processing device. For example, in a flight simulator, one of the buttons could be programmed to activate the elevator. Switch button 34 may be formed of a late, material with a metal contact on the back to provide electrical contact. Depression OL switch button 34 provides contact to printed circuit board 53, which sends a signal through wiring (not shown) at cord 13 to an information processing device.

Switch 35 is shown as an alternate switch embodiment. In this example, switch 35 includes an activator coupled to a potentiometer to simulate a throttle function in a flight simulator. Movement of the switch activator varies the resistance of the potentiometer, which is electrically coupled with printed circuit board 37 which sends a signal through wiring (not shown) to main printed circuit board 38 to cord 13 to an information processing device.

Figure 3:
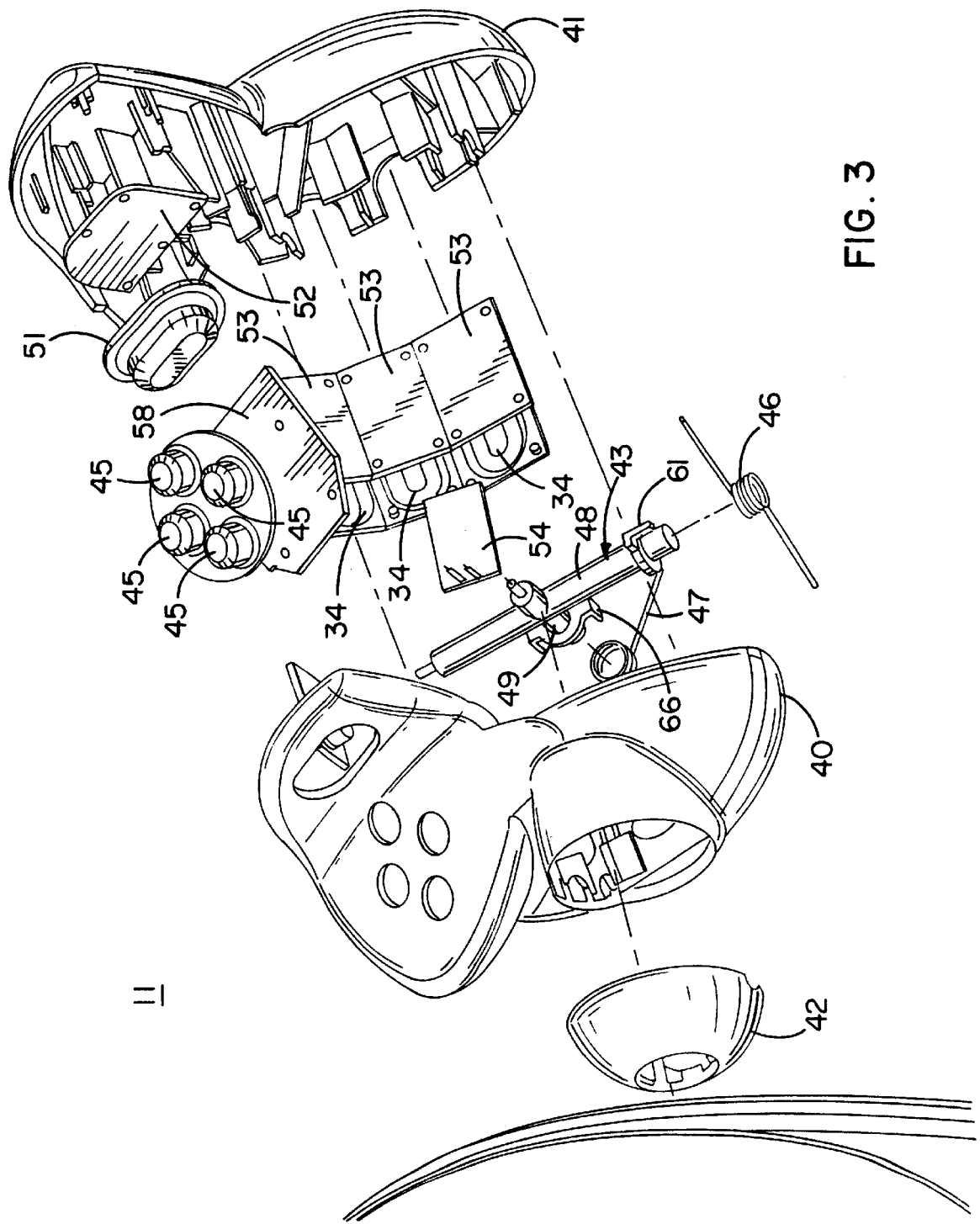
FIG. 3 is an exploded view of a right handle.

Referring to FIGS. 2 and 3, right handle 11 includes outer cover 41 and inner cover 40. A plurality of switch buttons 34 (not shown), similar in construction to switch buttons 34 on the left handle can be programmed through the information processing device to activate program functions. These functions many be the same functions as for the left handle or different functions. In this embodiment, buttons 34 on the left and right handles are connected to provide the same user input.

Four switch buttons 45 may be programmed to provide additional program functions. In this embodiment, switch buttons 45 are shown activating a hat switch, which can be used to control movement of a hat worn by a user. Buttons 45 activate printed circuit board 58, which send signals through wiring (not shown) to main board 38 to the information processing device. Switch button 51 is shown in this embodiment as a thumb switch, which activates against printed circuit board 52, which sends signals through wiring (not shown) to main board 38 to the information processing device.

Optional member 42, a hemi-spherically shaped connector, locks onto main shaft 20, which couples the second end of main shaft 20 to a second transducer (also a potentiometer in this embodiment, but not shown) electrically coupled to printed circuit board 54, which detects rotation of dual shaft 43 about the X-axis. Drive member 43, shown as a dual shaft, includes first arm 48, which rotates about the X-axis and second arm 49 which rotates about the Z-axis. Torsion spring 47 is held in a pre-loaded position on projection 66 of arm 49. One arm of torsion spring 47 is fired and the other moves to center arm 49 about the Z-axis in the absence of inputs. Torsion spring 46 is held in a pre-loaded position on projection 61 of arm 48. Similarly, one arm of torsion spring 46 is fixed and the other moves to center arm 48 about the X-axis in the absence of inputs.

Housing 10 includes left section 110 and right section 105, which are held together by a plurality of clips 27. Left section 110 includes a hole through which drive member 30 extends to couple with left handle 12. Similarly, right section 105 includes a hole through which drive member 30 extends to couple with right handle 11. Printed circuit board 38 is the main printed circuit board which connects all other boards to cord 13 (wiring not shown).

Figure 5C:
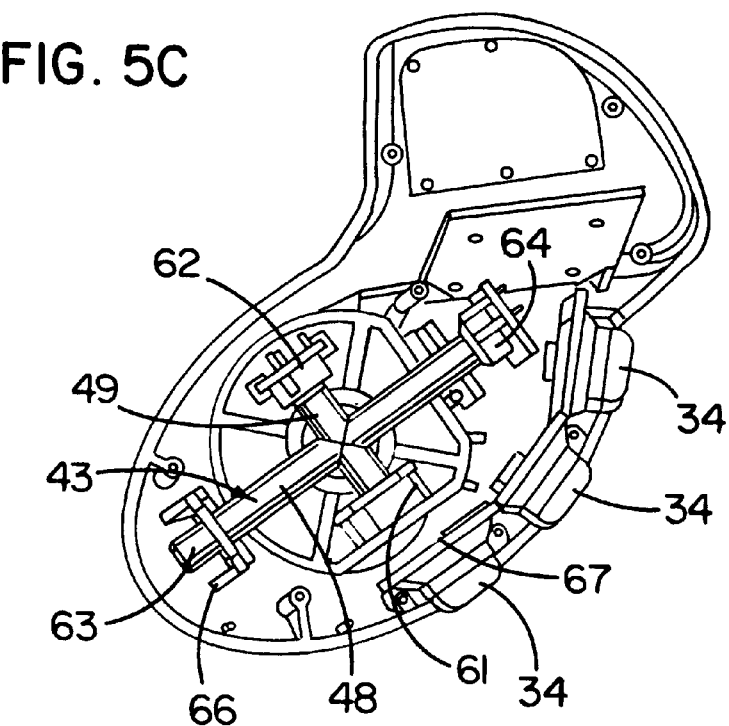
FIG. 5C is an inside view of the right handle with its outside cover removed, along line A—A of FIG. 5A.

FIG. 5A is a view of controller 100 along the X-axis. Switch 35 is shown on the left handle; switches 45 are shown on the right handle. FIG. 5C is an inside view along line A—A of FIG. 5A. Dual shaft 43 includes arm 48 rotatable about the X-axis and arm 49 rotatable about the Z-axis. Transducer 62 is coupled to member 42 which is coupled to main shaft 90. Right handle 11 is coupled to arm 49 via arm 48 for detection of rotation of right handle 11 about the Z-axis. The other end 67 of arm 49 is coupled to right handle 11 via projections 61. Transducer 64 couples right handle 11 to arm 48 for detecting rotation of right handle 11 about the X-axis. The other end 63 of arm 48 is coupled to right handle 11 via projections 66.

Figure 5D:
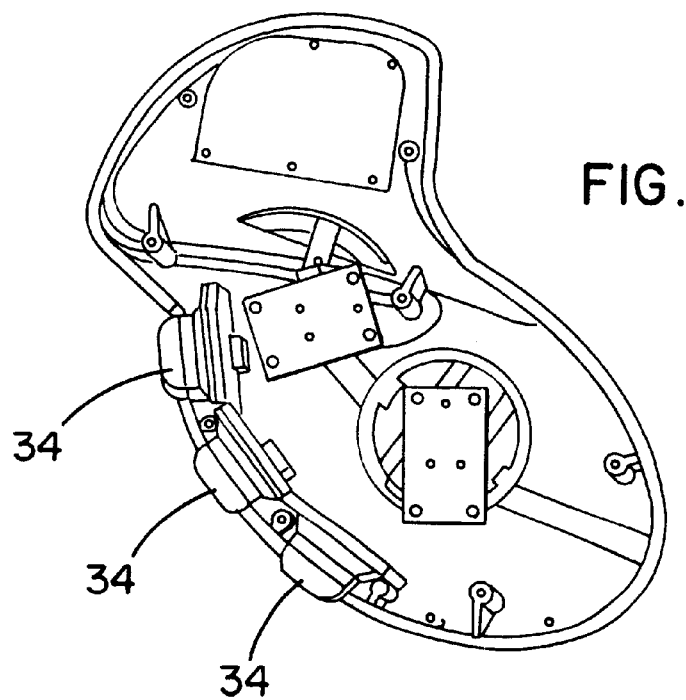
FIG. 5D is an inside view of the left handle with its outside cover removed, along line B—B of FIG. 5B.
Figure 6A:
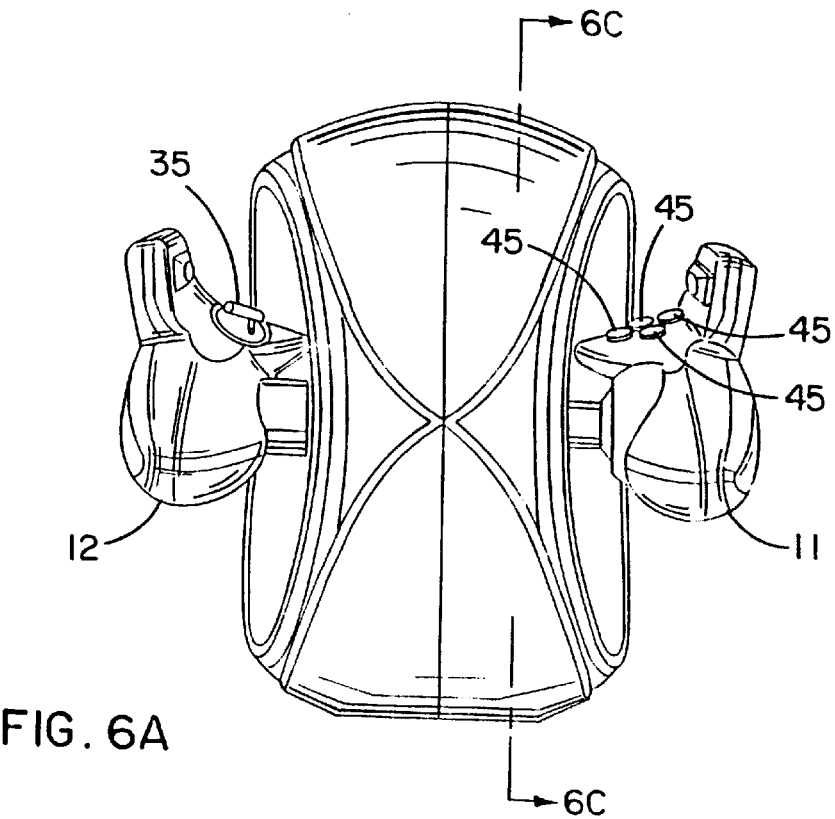
FIG. 6C is an inside view of the right handle with its inside cover removed along line C—C of FIG. 6A.
FIG. 6D is an inside view of the left handle with its inside cover removed, along line D—D of FIG. 6B.
Figure 6B:
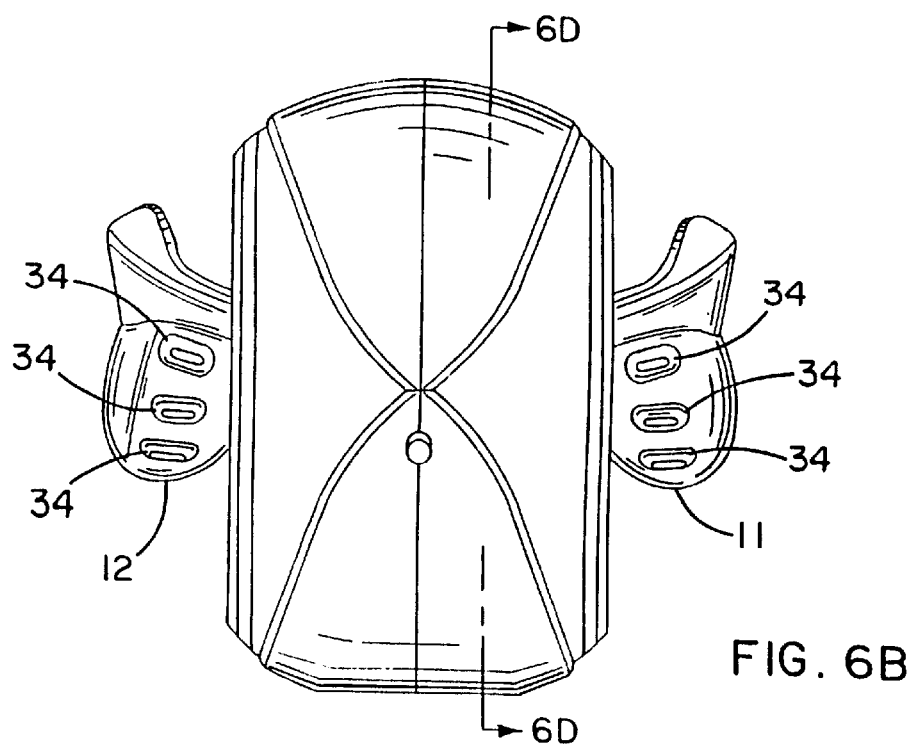
Figure 6C:
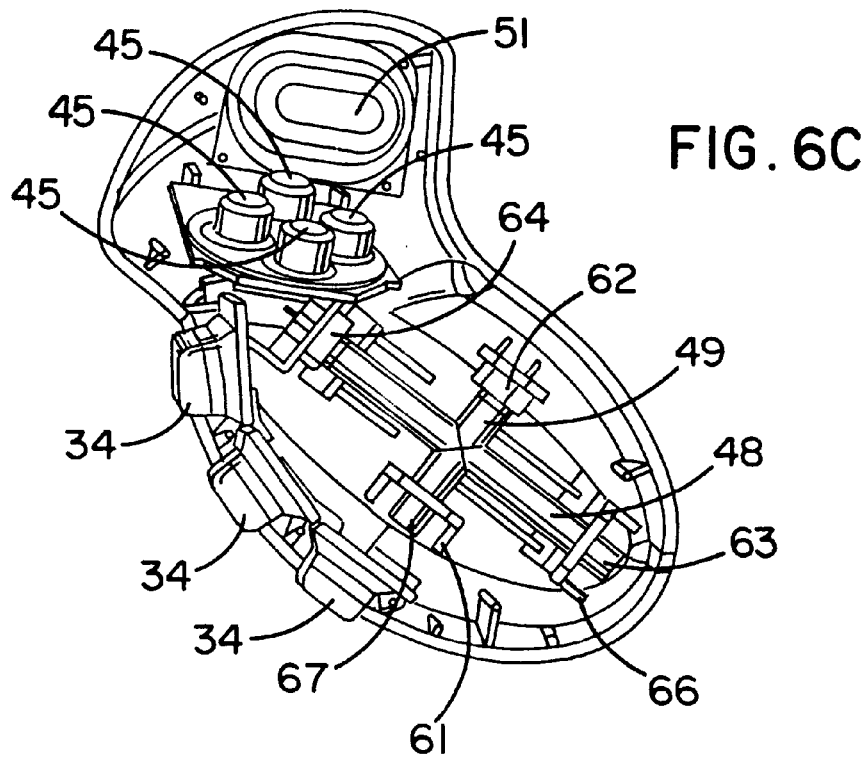
Figure 6D:
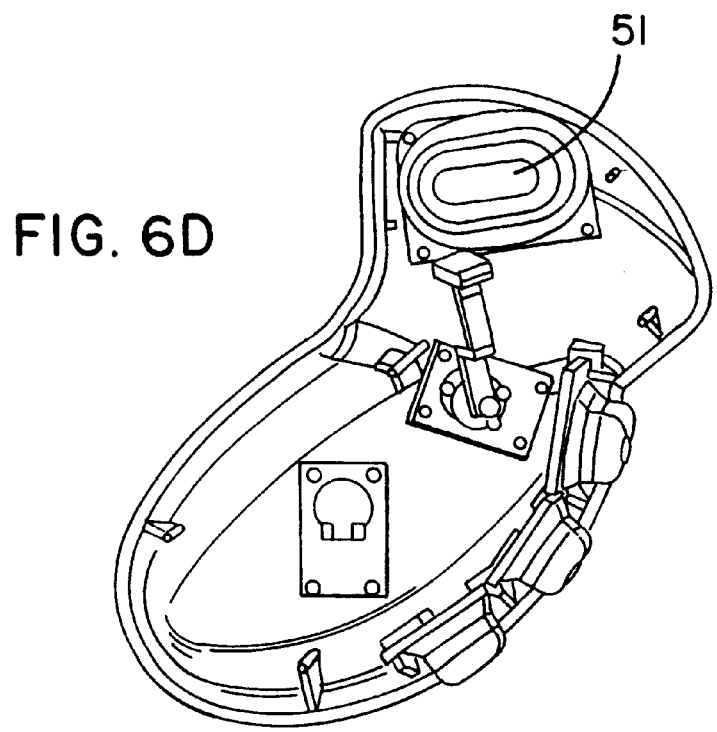

FIG. 5D is an inside view of left handle 12 along line B—B of FIG. 5B. FIG. 6C is an outside view of right handle 11 along line C—C of FIG. 6A, with similar elements marked the same as in FIG. 5C. FIG. 6D is an outside view of the left handle along line D—D of FIG. 6B, with similar elements labeled the same as in FIG. 5D.

FIG. 7 is a perspective view of the right handle 11 as coupled to main shaft 20 of drive member 30. Right handle 11 includes hat switches 45 and thumb switch 51. Member 42 is coupled to one end of main shaft 20. The other end of main shaft 20 includes projections 71 for keying into cap 25 which is coupled to first potentiometer 31.

Figure 11:
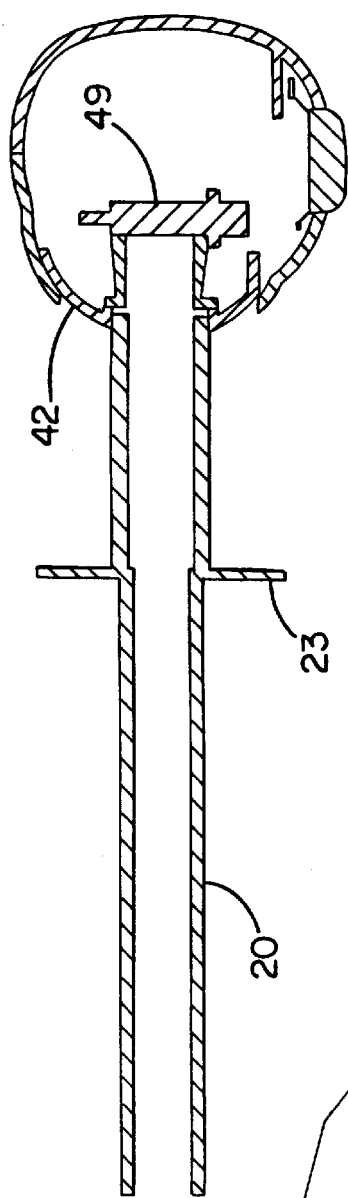
FIG. 11 is a cross-sectional view along line B—B of FIG. 8.
Figure 12:
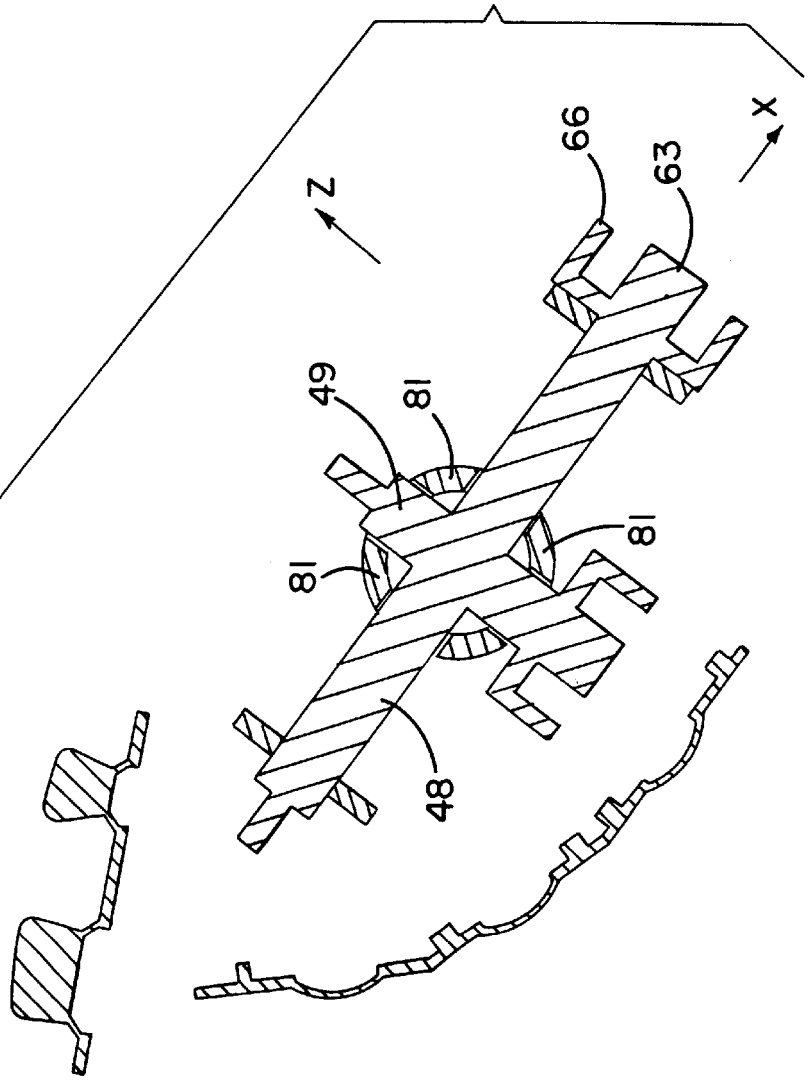
FIG. 12 is a cross-sectional view along line C—C of FIG. 9.

FIG. 10 is a cross-section of right handle 11 along line A—A of FIG. 8. Main shaft 20 is coupled to the right handle 11 via member 42. Arm 48 is shown coupled at end 63 to right handle 11 via projections 66. FIG. 11 is a cross-section of right handle 11 along line B—B of FIG. 8. Arm 49 of dual shaft 43 is supported in main shaft 20 via four projections 81 (shown in FIG. 12) and member 42. FIG. 12 is a cross-section of right handle 11 along line C—C of FIG. 9.

Figure 13A:
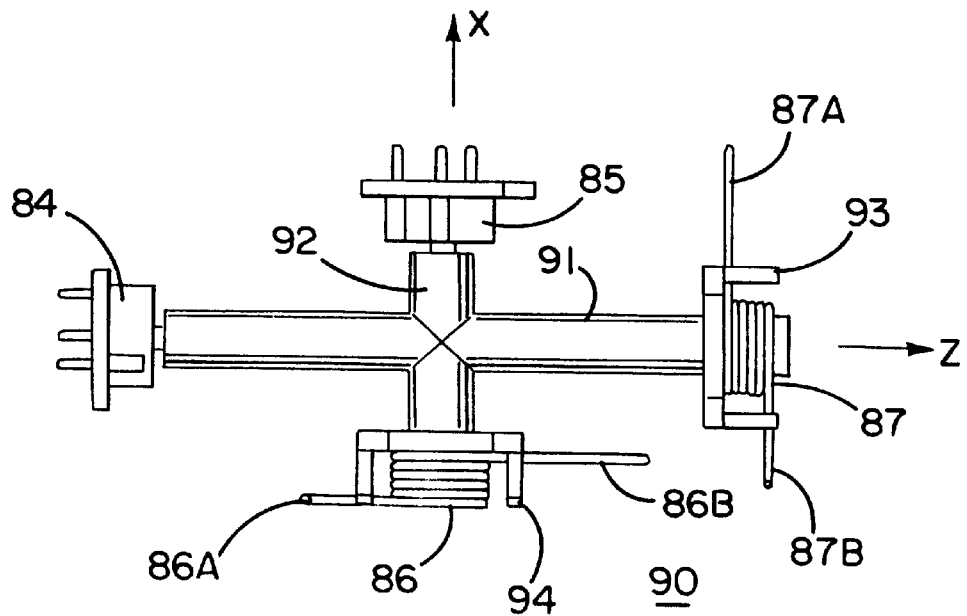
FIGS. 13A and 13B are views of the dual shaft.
Figure 13B:
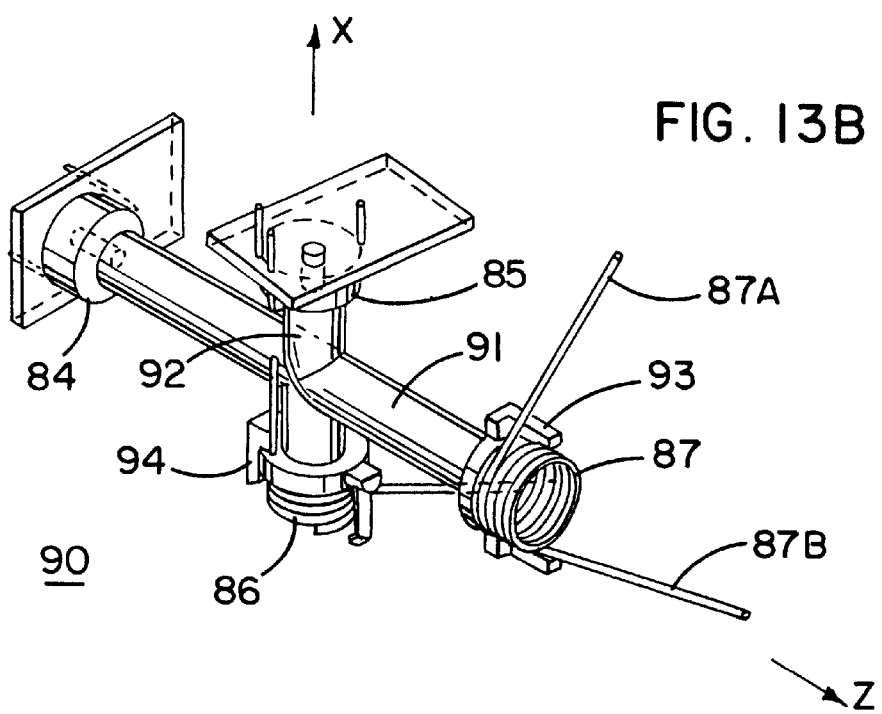

FIG. 13A is a top view and FIG. 13B a perspective view of a dual shaft 90 for use in a controller according to the invention. Dual shaft 90 includes two arms 91, 92 formed at right angles to one another. Rotation of arm 91 about the Z-axis is detected by transducer 84 (also shown as a potentiometer). The other end of arm 91 is provided with a torsion spring 87 for centering the arm. Torsion spring 87 includes projections 87A and 87B. Rotation of arm 91 causes projection 87A to he fixed against an external support (not shown) while projection 87B rotates with arm 91. Removal of the rotation force causes arm 87B to spring back to its original location.

Similarly, rotation of arm 92 about the X-axis is detected by transducer 85 (shown as a potentiometer). Torsion spring 86 includes projections 86A and 86B. Rotation of arm 92 causes projection 86A to be fixed against an external support (not shown) while projection 86B rotates with arm 92. Removal of the rotation force causes arm 86B to spring back to its original location.

Figure 14:
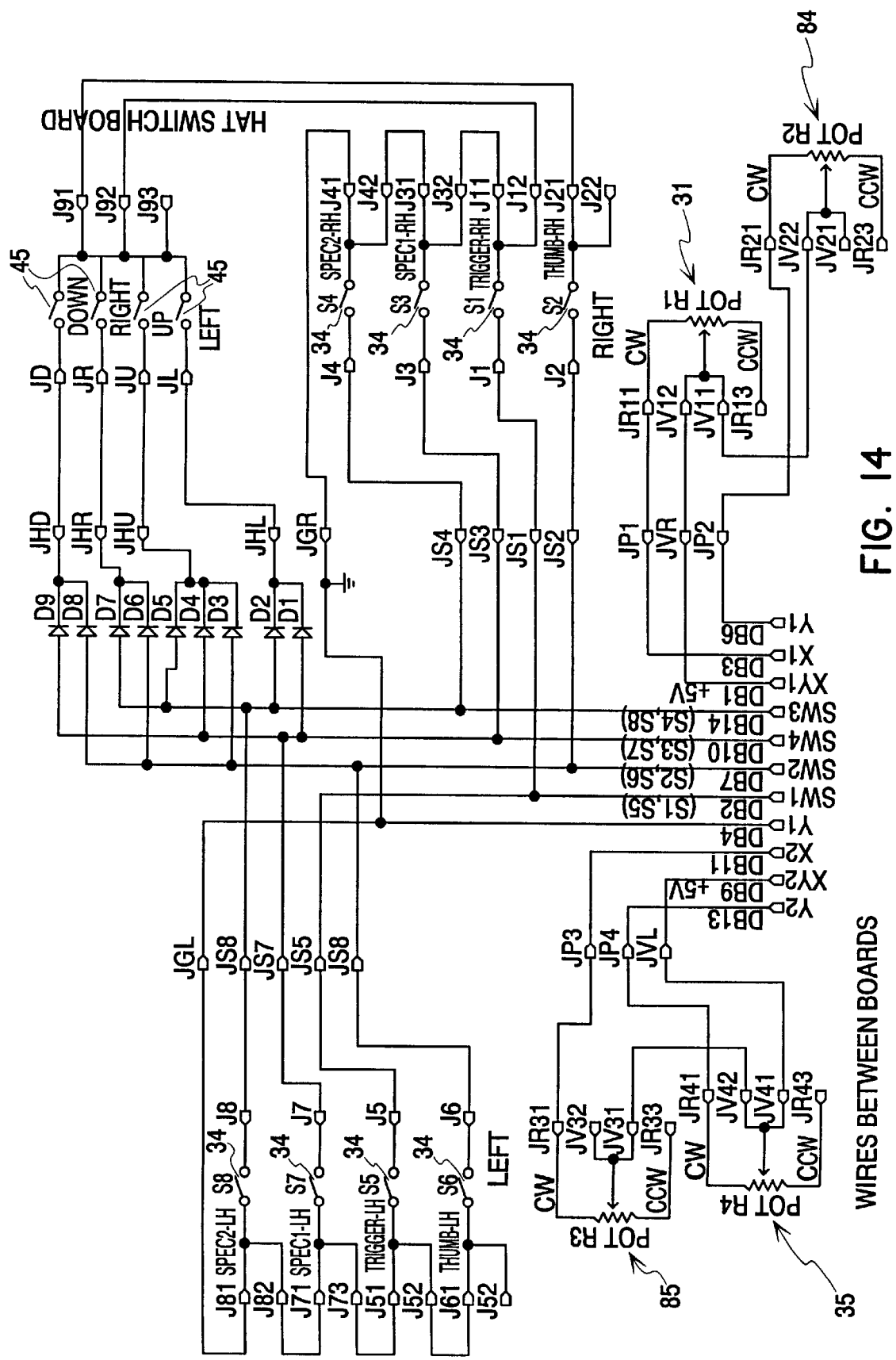
FIG. 14 is a circuit diagram of the electronics for the controller of FIG. 1.

FIG. 14 shows the wiring connections between the various switches and printed circuit boards. Ground is provided at DB4. Transducers 31, 84 and 85 are shown as potentiometers R1, R2 and R3 respectively. Transducers 31 and 84 receive +5V power through lead DB1 in main circuit card 38. Transducer 85 receives +5V power from lead DB9. User inputs, clockwise (CW) or counterclockwise (CCW), are picked up at leads DB3, DB6 and DB11 respectively. The transducer for switch 35 in the left handle is shown as potentiometer R4. User inputs are picked up at lead DB13.

Switches 34 in left handle 12, designated S5, S6, S7 and S8, close contact with their respective printed circuit boards, and are directly connected to switches 34 in right handle 11, designated S1, S2, S3 and S4. For example, if a user pushes S1 in the right handle or S5 in the left handle, contact is sent to lead DB2 in cord 13. The output of S2 and S6 is provided through lead DB7 in cord 13. The output of S3 and S7 is provided through lead DB10 in cord 13. The output of S4 and S8 is provided through lead DB14 in cord 13.

Hat switches 45 are designated "down, right, up and left" and draw current when they are depressed through diodes D1 through D9 on main board 38, simulating the action of the respective switches 34 in the right or left handles. For example, when hat switch DOWN is depressed, it draws current through diodes D9 and D8, which correlate with DB7, which is the same as if S3/S7 were depressed, and DB10, which is the same as if S2/S6 were depressed. When hat switch RIGHT is depressed, it draws current through diodes D7 and D6, which correlate with DB14, which is the same as if S4/S8 were depressed, and DB7, which is the same as if S2/S6 were depressed. When hat switch UP is depressed, it draws current through diodes D5, D4 and D3, which correlate with DB14, which is the same as if S4/S8 were depressed, DB10, which is the same as if S3/S7 were depressed, and DB7, which is the same as if S2/S6 were depressed. When hat switch LEFT is depressed, it draws current through diodes D2 and D1, which correlate with DB14, which is the same as if S4/S8 were depressed, and DB10, which is the same as if S3/S7 were depressed.

Additional modifications to the controller are possible. Tactile feedback means can be added to provide tactile feedback from the virtual or real 3D environment to the user. The drive member can be modified to provide means for translating the main shaft relative to the shrouding shaft, along the first axis.

Figure 15:
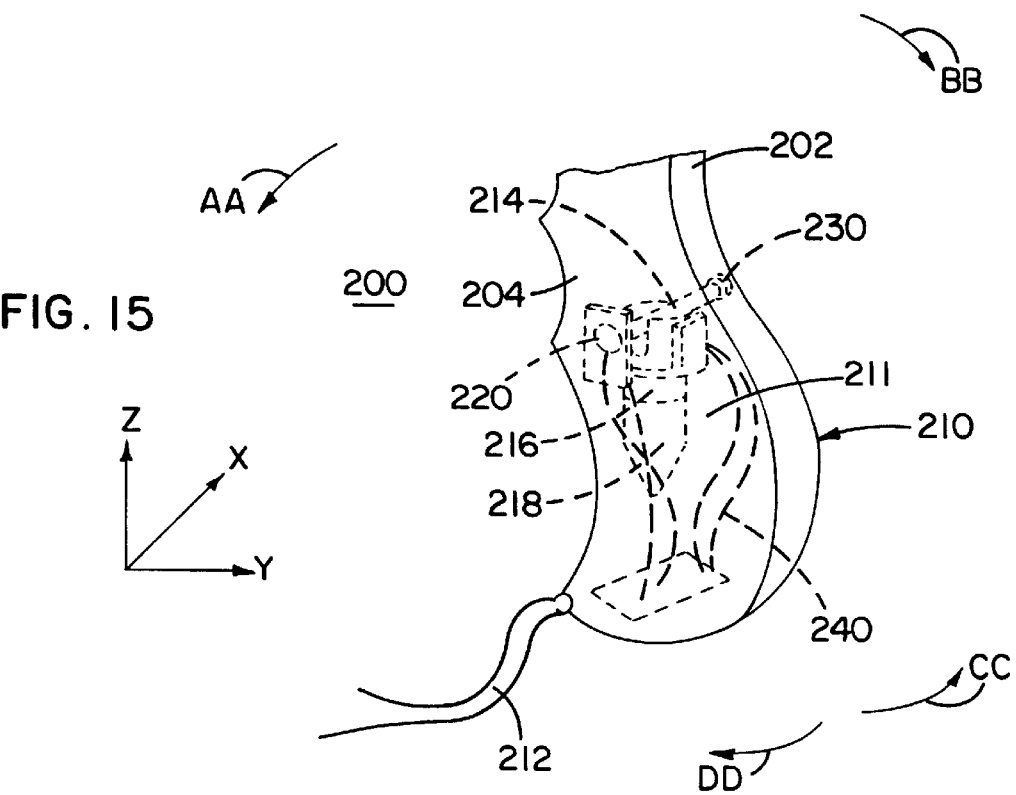
FIG. 15 is a perspective view of an alternative embodiment of a multi-axis controller according to the invention.
Figure 16:
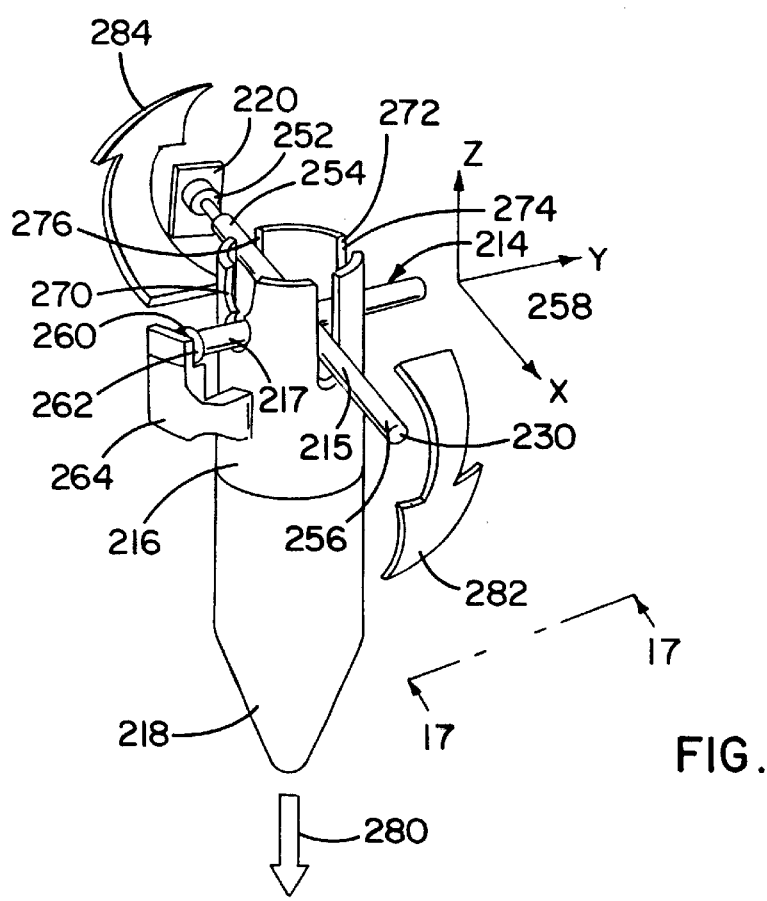
FIG. 16 is a perspective of the dual shaft and transducer arrangement shown in FIG. 15.
Figure 17:
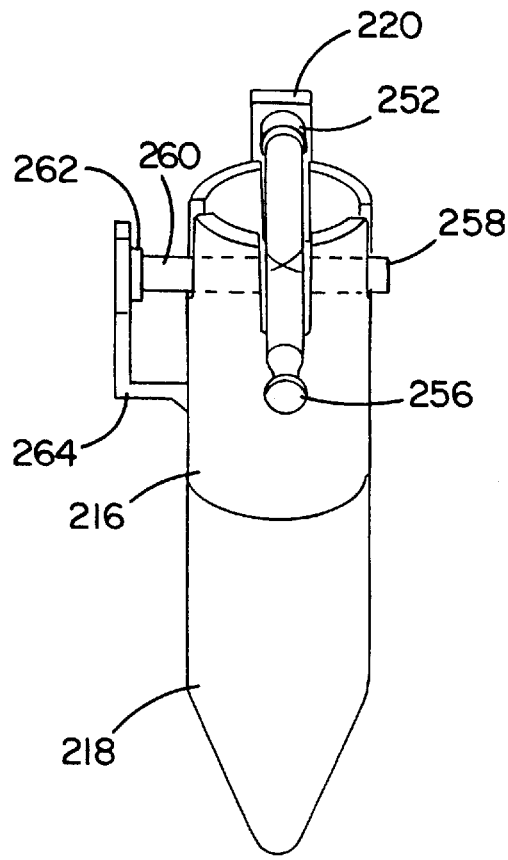
FIG. 17 is a view along line A—A of FIG. 16.

Referring to FIG. 15, a controller comprises an alternative embodiment of the invention. The controller which is particularly suited for electronic game play is generally shown therein and referred to by numeral 200. Controller 200 includes a handle 210, which may be shaped in any convenient manner. Handle 210 may be formed of any suitable material, but is preferably formed of molded plastic, with a substantially hollow interior 211. The handle 210 may be formed in two pieces 202 and 204 for ease of assembly. Disposed within the hollow interior 211 is a dual shaft 214. Dual shaft 214 is fixedly attached at one end 256 to the interior 211 at a point 230. The other end 254 of the dual shaft 214 is rotatably connected to a transducer 252. The transducer 252 is fixedly attached to the interior 211 at point 220. The entire dual shaft 214 and a frame 216 with attached weight 218 is supported within the interior 211 at these two points, 220 and 230.

The controller 200 is shown preferably with potentiometers as the transducer elements. The transducers generate an electric signal representative of the amount of rotation or position of the respective arm of the dual shaft (as described above). Wires 240 transmit the signals from the potentiometers, through the cable 212. The cable 212 is preferably mounted at a convenient location on the outside of the handle 210. Cable 212 may be coupled to a personal computer or other information processing device as described above for the controller.

Controller 200 employs the dual shaft 214, which is similar to the dual shaft 90 shown in FIGS. 13A and 13B. The major difference between the dual shaft 90 and the dual shaft 214 is that the dual shaft 214 does not have any torsion springs for providing tactile feedback to the user (or for centering the dual shaft in the absence of user input).

Referring now to FIGS. 17–21, the dual shaft 214 includes a first arm 215 and a second arm 217. The first arm 215 includes a first end which is coupled to rotate the transducer 252 at first end 254. In this embodiment the transducer 252 is a potentiometer. Alternatively, it may be a shaft encoder or other mechanical pickup. Transducer 252 is fixedly attached to the interior 211 of handle 210 at location 220. Rotation of the first arm 215 around a first axis, noted for convenience as the "X" axis, changes the effective electrical resistance of transducer 252. Suitable electrical connections are not shown for convenience.

Second arm 217 includes a first end 260 and a second end 258. The first end 260 is coupled to a second transducer 262. The second transducer 262 is also a potentiometer and alternatively may be a shaft encoder or other mechanical pickup. Frame 216 supports second transducer 262 and also provides tactile feedback to the user. Frame 216 is formed of a suitable plastic, such as ABS and includes four cutouts 270, 272, 274 and 276. Cutouts 270 and 274 include a generally circular section which is large enough to rotatably support frame 216 about second shaft 217. Cutouts 272 and 276 are preferably generally U-shaped to permit rotation of the first arm 215 about second arm 217 or second axis, conveniently referred to as the "Y" direction. Preferably the cutouts are sized to permit 20 degrees movement above and below an arbitrary plane formed by the dual shaft 214.

Figure 18:
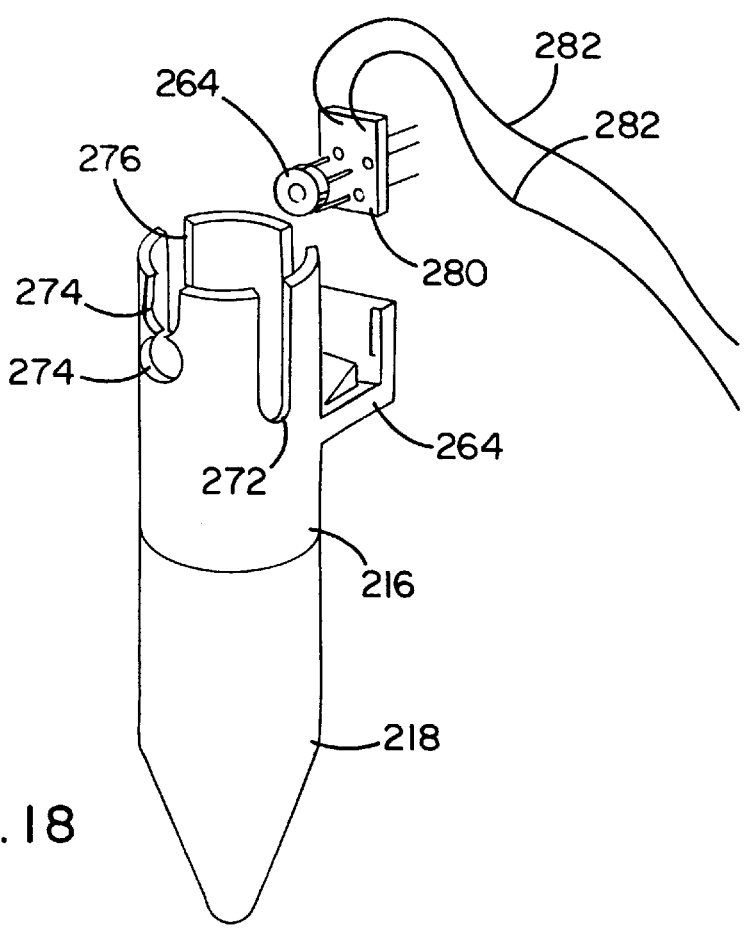
FIG. 18 is a view showing details of the back side of the frame and transducer connection for the second arm.
Figure 19:
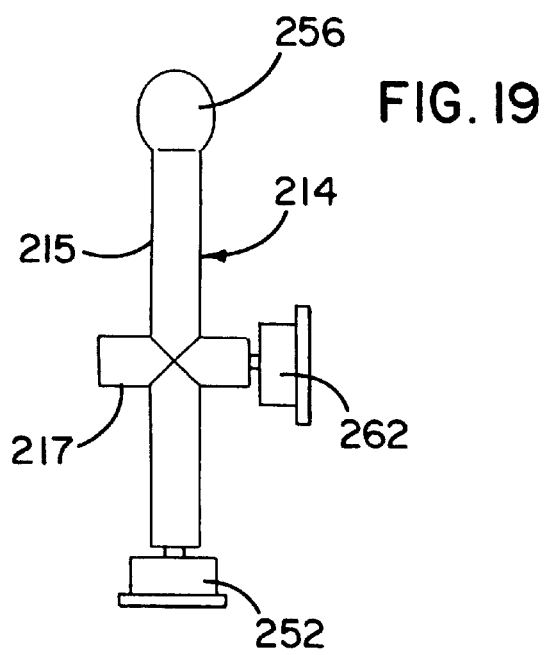
FIG. 19 is a top view of the dual shaft and transducers shown in FIG. 15.
Figure 20:
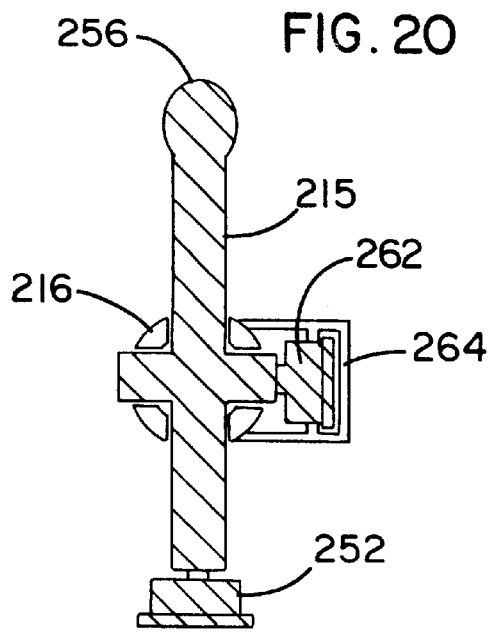
FIG. 20 is a cross section of the dual shaft and transducers shown in FIG. 19.
Figure 21:
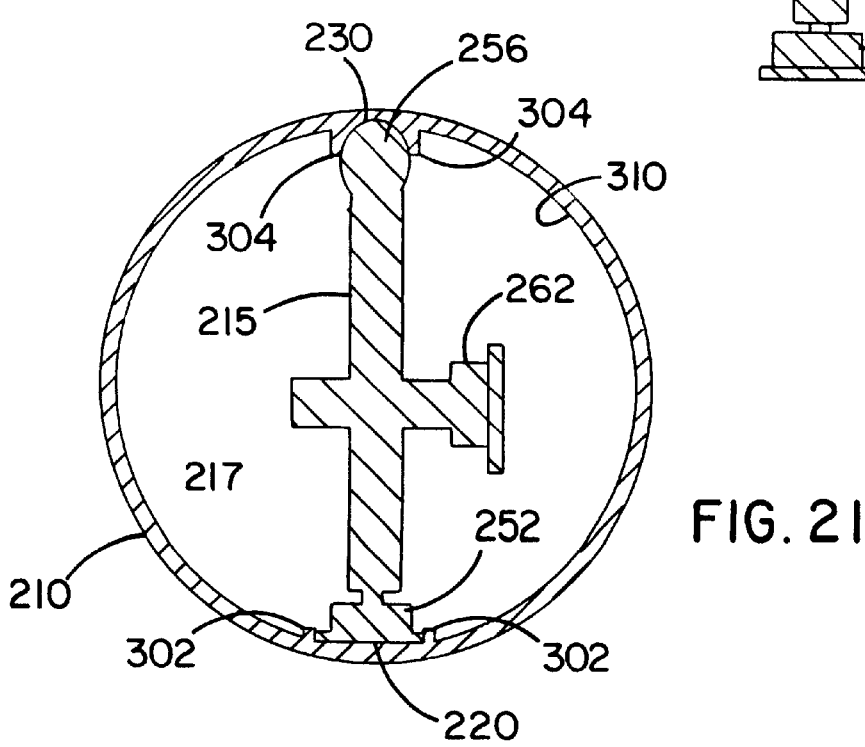
FIG. 21 is a cross section of the dual shaft and transducers of FIG. 20 shown mounted within the handle.

Frame 216 includes an extension 264 to which is fixedly attached the second transducer 264. FIG. 18 shows an exemplary electrical attachment of transducer 264 to a circuit hoard 280 with wires 282. Also preferably attached to frame 216 is weight 218. Preferably the weight 218 is formed of a metal such as lead. Weight 218, which is acted upon by gravity, indicated by arrow 280, (also conveniently shown as the "Z" avis) causes the dual shaft 214 to return to a neutral or centering position with respect to the vertical Z axis) in the absence of a user input. Frame 216 and weight 218 also provide tactile feedback to the user, similar to that described above with respect to torsion springs in dual shaft 90. The shape of frame 216 and weight 218 may be varied. Preferably the frame 216 and weight 218 are sized to permit free movement within interior 211.

First arm 217 is preferably mounted within interior 211 at the inner surface 310. Note that in FIG. 21, ridges 304 have been formed in the inner surface 310 at location 230 for fixedly supporting the first end 256 of the first arm 215. Similarly, ridges 302 have been formed at the location 220 for supporting the transducer 252. Other means of attachment are also possible.

To operate the controller for control in an X-Y plane would proceed generally as follows. The user would grip the controller 200 using the handle 210 and move the orientation of the controller 200. Suggested play movements are shown by arrows AA, BB, CC, DD in FIG. 15. Moving the controller 200 in the direction AA or BB causes a rotation of the dual shaft about the X avis. Note that weight 218 points in the same direction—toward gravity—during all movement. Moving the controller 200 in the CC or DD directions causes a rotation of the dual shaft about the Y axis. When the user stops moving the controller 200, the dual shaft 214 is centered by the action of gravity on weight 218.

The user can hold the controller 200 at any location, or move around a room. The user is only constrained by the length of the cable 212 (or other limitations of signal transmission if RF or IP is used in lieu of a cable).

Figure 22:
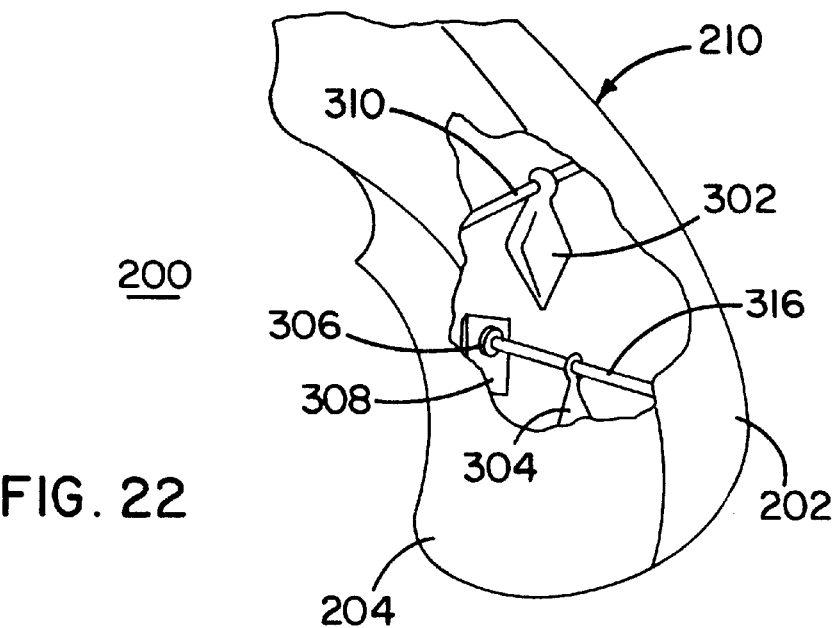
FIG. 22 is a perspective view of another alternative embodiment of a multi-axis controller according to the invention.
Figure 23:
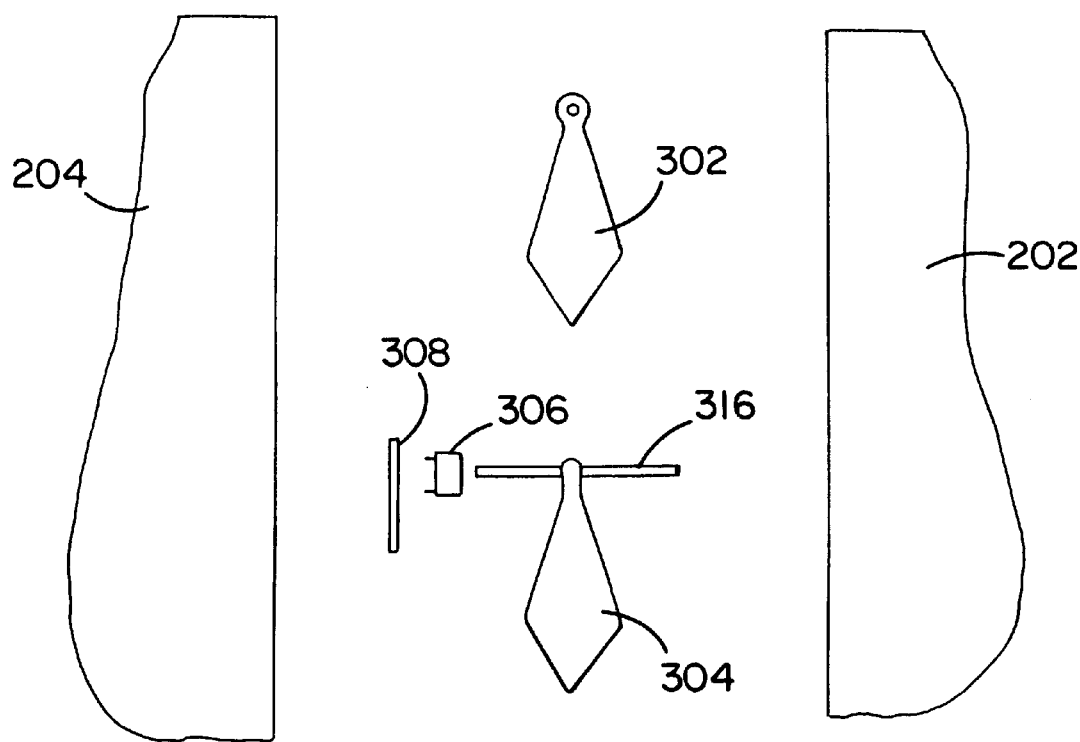
FIG. 23 is an exploded view of the controller shown in FIG. 22.

Controller 200 can also operate with separate shafts or arms for the "X" and "Y" ages. Referring to FIG. 22, controller 200 includes handle 210 formed conveniently of two pieces 202 and 204. Provided within controller 200 are two separate arms or shafts 310 and 316. Shaft 316 includes a first end which is fixedly attached to the interior of handle 210. The other end of shaft 310 is coupled to rotate a transducer 306. The transducer 306 is fixedly attached to the interior of handle 210 at support 308 (support 308 may also be a circuit board, with wires not shown). Weight 304 is rotatably attached to shaft 316 and always points in the direction of gravity. Movement of handle 210 in the "Y" direction the potentiometer 306 to move relative to shaft 310. Similarly, shaft 310 and weight 302 operate to detect movement in the "X" direction. Note that shafts 310 and 310 are positioned in the "X" and "Y" directions with respect to each other within handle 210.

While there have been illustrated and described particular embodiments of the invention, it will be appreciated that numerous changes and modifications will occur to those skilled in the art, and it is intended in the appended claims to cover all those changes and modifications which fall within the true spirit and scope of the invention.

What is claimed is:

1. A multi-axis controller, comprising:

a handle having an inner surface;

a dual shaft disposed within the handle, the dual shaft having: a first arm rotatable about a first axis, wherein the first arm includes a first end and a second end, wherein the second end is fixedly attached to the inner surface of the handle, and a second arm rotatable about a second axis;

a first transducer fixedly attached to the inner surface of the handle and coupled to the first arm of the dual shaft, for detecting the rotation about the first axis;

a second transducer, coupled to the second arm of the dual shaft for detecting the rotation about the second axis; and a frame fixedly attached to the second transducer.

2. The controller of claim 1 wherein the frame further includes a weight for centering the controller about the first axis and the second axis in the absence of user input and for providing tactile feedback.

3. A multi-axis controller, comprising:

a handle having an inner surface;

a first shaft disposed within the handle, the first shaft being rotatable about a first axis, wherein the first shaft includes a first end and a second end, wherein the second end is fixedly attached to the inner surface of the handle;

a second shaft disposed within the handle, the second shaft being rotatable about a second axis, wherein the second shaft includes a first end and a second end, wherein the second end is fixedly attached to the inner surface of the handle;

a first transducer fixedly attached to the inner surface of the handle and coupled to the first end of the first shaft for detecting the rotation about the first axis;

a second transducer, fixedly attached to the inner surface of the handle and coupled to the first end of the second shaft for detecting the rotation about the second a first weight rotatably coupled about the first shaft; and a second weight rotatably coupled about the second shaft.

* * * * *